United States Patent
Westerman et al.

(10) Patent No.: US 6,826,688 B1
(45) Date of Patent: Nov. 30, 2004

(54) METHOD AND APPARATUS FOR DETERMINING THE IDENTITY OF A DIGITAL PRINTER FROM ITS OUTPUT

(75) Inventors: Larry Westerman, Portland, OR (US); Thomas Davis, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/277,801

(22) Filed: Mar. 27, 1999

(51) Int. Cl.[7] ................................................ H04L 9/00
(52) U.S. Cl. ..................................... 713/176; 358/3.28
(58) Field of Search ..................... 713/176; 380/54–55; 382/112, 232; 705/57–59; 347/111, 131; 358/1.1, 3.28, 501, 530, 1.5, 1.6, 1.9, 2.1

(56) References Cited

U.S. PATENT DOCUMENTS

| | | | |
|---|---|---|---|
| 4,680,647 A | * | 7/1987 | Moriyama ................... 386/112 |
| 5,029,108 A | | 7/1991 | Lung |
| 5,321,433 A | | 6/1994 | Zulian |
| 5,357,583 A | * | 10/1994 | Sato et al. .................. 382/269 |
| 5,396,584 A | | 3/1995 | Lee et al. |
| 5,488,664 A | | 1/1996 | Shamir |
| 5,515,480 A | | 5/1996 | Frazier |
| 5,530,759 A | | 6/1996 | Braudaway et al. |
| 5,568,550 A | | 10/1996 | Ur |
| 5,579,445 A | | 11/1996 | Loce et al. |
| 5,579,451 A | | 11/1996 | Suzuki et al. |
| 5,606,609 A | | 2/1997 | Houser et al. |
| 5,606,648 A | * | 2/1997 | Walther et al. ............... 358/1.7 |
| 5,659,399 A | * | 8/1997 | Lin et al. .................... 358/3.02 |
| 5,661,574 A | * | 8/1997 | Kawana ...................... 358/501 |
| 5,696,845 A | | 12/1997 | Loce et al. |
| 5,706,046 A | | 1/1998 | Eki et al. |

* cited by examiner

Primary Examiner—Kim Vu
Assistant Examiner—Hosuk Song
(74) Attorney, Agent, or Firm—Marger Johnson & McCollom, P.C.

(57) ABSTRACT

A method for inserting an identification modulation code into a printed image. The method has the steps of inserting a start code modulation sequence, followed by the code modulation sequence, and then a stop code modulation sequence. The code is preferably repeated several times throughout the printed image. The modulation sequence can have several levels of subpixel modulation magnitude.

7 Claims, 1 Drawing Sheet never

METHOD AND APPARATUS FOR DETERMINING THE IDENTITY OF A DIGITAL PRINTER FROM ITS OUTPUT

BACKGROUND OF THE INVENTION

1. Field of the Invention

This invention relates to methods of identifying printers, more particularly to methods for controlling the print output to allow identification.

2. Background of the Invention

Watermarking on printed paper gives anyone receiving the paper a means to ensure that the paper and what it is printed on it is authentic. Examples include currency, stock certificates, money orders and government documents. With the advent of digital transmission of images to be printed, however, watermarking does not work as effectively as when most transactions involved paper.

Examples of this type of electronic watermarking are shown in U.S. Pat. No. 5,606,609, issued to Houser, et. al., on Feb. 25, 1997. In this patent, the data is marked with a security object that contains security information, some type of electronic signature and an identifier. The identifier invokes the security information when the document is displayed. The integrity of the document is then verified and the signature is displayed. If the integrity does not verify then the signature is not displayed.

Another example of this type of watermarking is shown in U.S. Pat. No. 5,488,664, issued to Shamir on Jan. 30, 1996. In this patent, a watermark is displayed with the image, thereby allowing visual authentication of the image. The watermark is incorporated by the method in one of two ways. One method prints groups of subpixels on two different layers, an original and a decoding sheet. The other method prints the subpixels on two layers of the original. Both layers must be displayed and viewed simultaneously to show the watermark.

However, all of these patents focus primarily on protecting the display of the image, rather than the printout of the image. Once the image is printed, in most cases, it is nearly impossible to tell from where it came.

One patent concentrates in this area, U.S. Pat. No. 5,568,550, issued to Ur, on Oct. 22, 1996. The patent is directed to identifying the software copy responsible for generating printed images.

In this patent, the method includes a dispersed image of dots in predetermined locations around a printed image. The dispersed image of dots is extracted from the printed image by a high-resolution scanner. The dispersed dots are put into the print image data at the print file, making them difficult to identify and extract the associated commands. However, even though this method tries to alleviate any problems in the resulting image quality, it is possible that it can adversely affect the quality. Further, the extraction of the pattern relies upon the clarity of the document and the availability of large areas of the printed page. This patent does not identify the print engine itself, just the software using the printer or print engine.

Identification of the printer or print engine has uses in security and law enforcement areas. If officials in these areas can determine from what printer a particular output was made, they can more effectively prevent unauthorized hard copies of secure documents and forgery of unauthorized documents, as examples.

Therefore, a method and apparatus is needed which allows identification of the printer by the output it produces, without having a detrimental effect on the print image quality.

SUMMARY OF THE INVENTION

An aspect of the invention is a method for inserting an identification modulation code into a printed image. The method comprises the steps of inserting a start code followed by the identification modulation code and then a stop code. The code is determined by the magnitude of the subpixel modulation. The magnitude of the subpixel modulation is decoded to determine the value of the code in that document.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 2a shows an example of a staircase artifact.

FIG. 2b shows an example of a correction of a staircase artifact using subpixel modulation.

DETAILED DESCRIPTION OF THE PREFERRED EMBODIMENTS

Figures 1, 3:
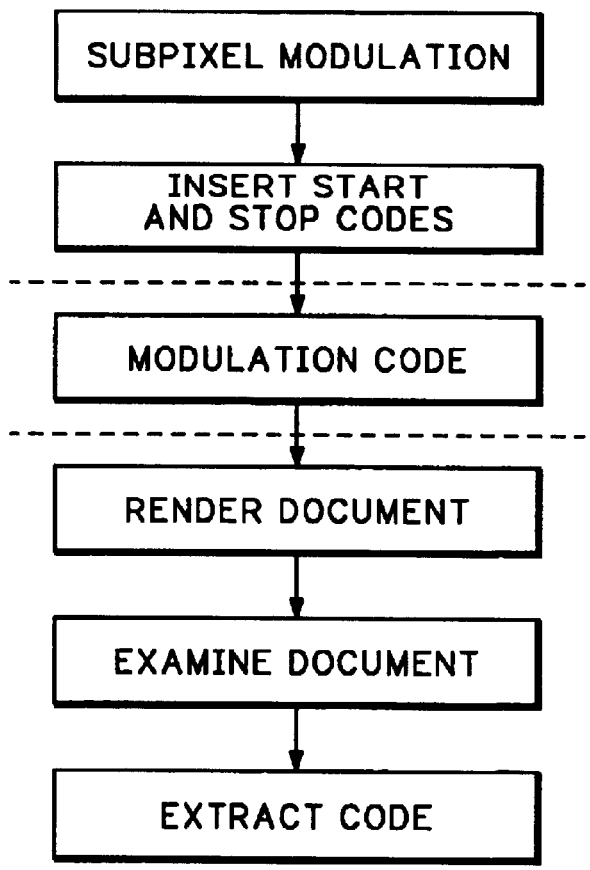
FIG. 1 shows a visible implementation of a method in accordance with the invention.
FIG. 3 shows a flowchart of a method in accordance with the invention.

Resolution enhancement techniques allow most printers to reduce artifacts caused by the printing process. For example, some electrophotographic printers form images by scanning a laser spot across an optical photoreceptor (OPC) in scan lines. Wherever the laser touches, charge forms on the surface of the OPC. The OPC then passes through a toner reservoir of oppositely charged toner. The charge on the surface of the OPC attracts the toner. The OPC then comes into contact with paper and the paper picks up the toner. A fuser then fuses the toner onto the paper. In summary, the laser forms the image by selectively touching or not touching the OPC in scan lines, which accrue to form an image.

Many printers, not just electrophotographic printers, have artifacts caused by the size and shape of the laser dot. For example, laser spots used to form curves can produce a stair-step artifact. The scan line used by the laser has specific locations along it where spots are formed or not. These locations form the picture elements or pixels of the printed image. In order to form a curve, for example, the laser spot may form a spot, where the toner will transfer to the paper, at location x on scan line 1. In scan line 2, the laser may form a spot at location x+1. In scan line 3, the laser may form a spot at location x+2.

The spots formed at the above locations may have been intended to form a smooth curve. However, the result is a stair-step, as shown by dashed line 10 in FIG. 2a. Some printers typically resolve this problem using techniques referred to as resolution enhancement, subpixel modulation or edge enhancement. In these techniques, the modulation of the laser is controlled on a to smooth the edges. This effect can be seen in FIG. 1.

FIG. 1 shows a magnified image of the printed word 'never.' In the course of printing this word, subpixel modulation was turned on at the middle of the V character. It is most noticeable when comparing the two sides of the V or comparing the two letters E. The second letter E has edge enhancement, and the first does not. The technique applied here was purposely done to make this difference noticeable. As will be discussed in detail later, an application of this invention makes this difference undetectable except in the sub-visual range.

Subpixel modulation typically changes the location of the data as it is printed by the print head. For example, if a series of scan lines had data as appeared in FIG. 2a, the printer control circuitry would identify that there is an edge present. It does not matter how the detection occurs, or what the object is that is detected, all that is necessary to implement the invention is some event that causes subpixel modulation to happen. Subpixel modulation in this context is any kind of alteration of the placement of the laser spots to enhance the quality of the final printed image.

As can be seen in FIG. 2a, the identification of the object, in this case an edge will cause the printer controller to turn on subpixel modulation. For purposes of discussion, an enhancement circuit will be assumed. The enhancement circuit typically changes the timing of certain laser spots to change the position in which the laser spot occurs on the OPC. An example of this is shown in FIG. 2b.

The timing of the laser spot is controlled such that it contacts the OPC earlier in the scan line, and lower down on the OPC. This can be shown by the difference between the placement of the ON spots, shows as ones (1), at 12a and 14a in FIG. 2a and 12b and 14b in FIG. 2b. As can be seen by this placement, the spots appear between the current positions of spots at a given resolution, resulting in the subpixel modulation having an effective resolution higher than the output of the printer. The enhancement circuit mentioned before can control the magnitude of this timing, thereby controlling the distance of the laser spot 'movement.'

In one embodiment of the invention, the magnitude of the modulation is also controlled. The control of the subpixel modulation will produce a detectable, but sub-visual, pattern that identifies the engine that produced the output. This identification modulation pattern can be detected in several ways, which will be discussed further.

In order to be detectable, the pattern must be specifically tagged as an identifying modulation pattern. Otherwise, the pattern may occur within the normal subpixel modulation of the document and produce a false result. Therefore, start and stop codes will be used to identify the specific identifying modulation pattern.

For example, a start code of a predetermined pattern is used. When this pattern of subpixel modulation is identified, it indicates that the next pattern will be the identification modulation pattern for that particular print engine. The codes are rendered into the print image as fixed-size areas of modulation levels of either subpixel modulation ON (1), or subpixel modulation OFF (0).

In implementation, one embodiment of the invention uses two levels of magnitude to control the subpixel modulation. Any number of levels or any magnitude could be used. For example, the levels may be full and none, or full and half. The first level is arbitrarily labeled 1 and the second 0. A fixed-length code is then constructed by combining the fixed size areas of modulation level in either pattern 0 or pattern 1, then stringing pairs together. Four pattern pairs are possible, 11, 10, 01 and 00. Let a four-pair sequence of 11, 11, 00, 11, be the start code. The four-pair sequence of 00, 00, 11, 11, will then be set to be the stop code in this example. Sequence 01, for example half/full, is the binary 0and sequence 10, for example full/half, is the binary 1. Following the parameters of this example, then, the below code was constructed.

11110011/01011001/00001111

The first series of 11110011 is the start code and the last series of 00001111 is the stop code. The middle sequence is 01, 01, 10, 01, which is the actual code of 0010.

For reliability, the pattern should be repeated several times throughout the document both horizontally and vertically. This will allow the pattern to be detected if there are areas on the document that are not printed, overcoming one of the problems mentioned in the prior art. This will also assist in decoding the document.

Decoding the document will be accomplished by microscopic examination of the image and recognition of the occurrence of the two different modulation levels. The document may be scanned at a high resolution, several times higher than the resolution of the document, for example. The scanned image can then undergo repeated two-dimensional Fourier or correlation over small areas of the image.

One method in accordance with the invention is shown in FIG. 3. This invention applies to any print engine performing subpixel modulation, as shown in step 20. The start and stop codes are implemented by controlling the subpixel modulation process to form the specific start code patterns desired by the system designer at step 22. At step 24, the actual identification modulation code is coded into the document by controlling the subpixel modulation to produce the print engine identifier. At step 26, the document is actual printed. It is then examined at step 28 and the code for the specific print engine is then extracted at step 30. It should be noted that all steps of the process outside the box 32 are independent from any implementation of the invention.

Thus, although there has been described to this point a particular embodiment for a method of identifying print engines by their output, it is not intended that such specific references be considered as limitations upon the scope of this invention except in-so-far as set forth in the following claims.

What is claimed is:

1. A method for inserting an identification modulation code into a printed image, comprising the steps of:

inserting a start code into a subpixel modulation process that alters placement of spots at a resolution higher than an output of a printer;

modulating said subpixel modulation process in accordance with a code, wherein said code alters the placement of the spots to produce a sub-visual pattern identifying a print engine producing the printed image; and inserting a stop code into said subpixel modulation process.

2. The method as claimed in claim 1, wherein said code is repeated several times throughout a printed image.

3. The method as claimed in claim 1, wherein said modulating further comprises modulating said subpixel modulation process between two levels of magnitude of timing.

4. The method as claimed in claim 3, wherein said modulating further comprises modulating said subpixel modulation process between full and half modulation.

5. The method as claimed in claim 3, wherein said modulating further comprises modulating said subpixel modulation process between full and no modulation.

6. The method as claimed in claim 1, wherein said start code further comprises a modulation sequence of 11110011.

7. The method as claimed in claim 1, wherein said stop code further comprises a modulation sequence 00001111.

* * * * *